(12) United States Patent
Wei

(10) Patent No.: US 10,917,896 B2
(45) Date of Patent: *Feb. 9, 2021

(54) USER EQUIPMENT, COMMUNICATION SYSTEM, AND METHOD OF CONTROLLING A USER EQUIPMENT

(71) Applicant: SONY CORPORATION, Tokyo (JP)

(72) Inventor: Na Wei, Beijing (CN)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/106,900

(22) Filed: Aug. 21, 2018

(65) Prior Publication Data

US 2018/0359741 A1 Dec. 13, 2018

Related U.S. Application Data

(63) Continuation of application No. 14/587,439, filed on Dec. 31, 2014, which is a continuation of application No. PCT/CN2014/090038, filed on Oct. 31, 2014.

(51) Int. Cl.
*H04W 72/04* (2009.01)
*H04W 8/00* (2009.01)

(52) U.S. Cl.
CPC .......... *H04W 72/048* (2013.01); *H04W 8/005* (2013.01)

(58) Field of Classification Search
CPC ..................... H04W 72/048; H04W 8/005
See application file for complete search history.

(56) References Cited

U.S. PATENT DOCUMENTS

| 2006/0133403 | A1  | 6/2006  | Chun |
| 2013/0109301 | A1* | 5/2013  | Hakola ................. H04W 76/14 455/39 |
| 2013/0150051 | A1* | 6/2013  | Van Phan ......... H04W 36/0011 455/437 |
| 2014/0141789 | A1* | 5/2014  | Tarokh .................. H04W 52/04 455/450 |
| 2014/0301285 | A1* | 10/2014 | Ahn ...................... H04W 8/005 370/329 |
| 2014/0328329 | A1* | 11/2014 | Novlan ............... H04W 56/002 370/336 |
| 2014/0335853 | A1* | 11/2014 | Sartori .................... H04W 4/70 455/426.1 |
| 2015/0043448 | A1* | 2/2015  | Chatterjee ............... H04W 4/70 370/329 |

(Continued)

FOREIGN PATENT DOCUMENTS

| CN | 103716869 | 4/2014 |
| CN | 104105103 | 10/2014 |

OTHER PUBLICATIONS

3GPP TSG-RAN WG2 #83bis, Ljubljana, Slovenia, Oct. 7-11, 2013, Issues in D2D communication, LG Electronics Inc.; 3 pages.

(Continued)

*Primary Examiner* — Mehmood B. Khan
(74) *Attorney, Agent, or Firm* — Tucker Ellis LLP

(57) ABSTRACT

A user equipment (2) has a wireless interface configured for communication with a cellular communication network. The user equipment (2) is configured to use device-to-device resources for device-to-device discovery and/or device-to-device communication. The device-to-device resources are dependent on whether the user equipment is out of coverage of the cellular communication network.

15 Claims, 10 Drawing Sheets

(56) References Cited

U.S. PATENT DOCUMENTS

| | | | |
|---|---|---|---|
| 2015/0043541 A1* | 2/2015 | Blankenship | H04W 72/02 370/336 |
| 2015/0045018 A1* | 2/2015 | Liu | H04W 76/14 455/426.1 |
| 2015/0117375 A1* | 4/2015 | Sartori | H04W 56/002 370/329 |
| 2015/0119056 A1* | 4/2015 | Lee | H04W 72/042 455/450 |
| 2015/0201392 A1* | 7/2015 | Sartori | H04W 8/005 370/329 |
| 2015/0208384 A1* | 7/2015 | Baghel | H04W 8/005 455/450 |
| 2015/0215979 A1* | 7/2015 | Nan | H04L 27/2646 370/329 |
| 2015/0223111 A1* | 8/2015 | Lindoff | H04W 24/02 370/252 |
| 2015/0223217 A1* | 8/2015 | Chen | H04W 72/044 370/329 |
| 2015/0230160 A1* | 8/2015 | Lin | H04W 76/18 370/252 |
| 2015/0264733 A1* | 9/2015 | Guo | H04W 48/06 370/329 |
| 2015/0289282 A1* | 10/2015 | Phuyal | H04B 3/232 370/329 |
| 2015/0296469 A1* | 10/2015 | Yoon | H04W 56/0015 370/350 |
| 2015/0319745 A1* | 11/2015 | Seo | H04W 72/0406 370/329 |
| 2015/0327240 A1* | 11/2015 | Yamada | H04W 8/005 455/426.1 |
| 2015/0327312 A1* | 11/2015 | Burbidge | H04W 76/14 370/329 |
| 2017/0013598 A1* | 1/2017 | Jung | H04W 72/02 |
| 2017/0019778 A1* | 1/2017 | Jung | H04W 36/08 |
| 2017/0303291 A1* | 10/2017 | Chae | H04W 72/12 |
| 2018/0343632 A1* | 11/2018 | Lee | H04J 11/00 |

OTHER PUBLICATIONS

3GPP TSG-RAN WG1 Meeting #76bis R1-141571, Shenzhen, China, Mar. 31-Apr. 4, 2014; Sony D2D Resource Pool and Scheduling Assignments; 5 pages.

3GPP TSG-RAN WG2 #87 Bis R2-144545, Oct. 6-Oct. 10, 2014, Shanghai, P. R. China, Qualcomm Incorporated, Data Resource pool for ProSe Direct Communication; 3 pages.

3GPP TSG-RAN WG2 #83bis, Ljubljana, Slovenia, Oct. 7-Oct. 11, 2013, Issues in D2D communication, LG Electronics Inc.; 3 pages.

* cited by examiner

USER EQUIPMENT, COMMUNICATION SYSTEM, AND METHOD OF CONTROLLING A USER EQUIPMENT

This application is a continuation of U.S. patent application Ser. No. 14/587,439, field on Dec. 31, 2014. U.S. patent application Ser. No. 14/587,439 is a continuation of International Application No. PCT/CN2014/090038, filed on Oct. 31, 2014. The entireties of the aforementioned applications are herein incorporated by reference.

FIELD OF THE INVENTION

Embodiments of the invention relate to mobile communication systems. Embodiments of the invention relate in particular to techniques for performing device-to-device discovery and/or device-to-device communication in mobile communication networks.

BACKGROUND OF THE INVENTION

The demand for mobile data and voice communication continues to evidence significant growth. Examples for mobile communication systems include cellular-based wireless communication networks. Such networks include various network nodes. The network nodes may include base stations which respectively provide coverage for a radio cell.

A user equipment of a mobile communication network may be a Proximity Service (ProSe) enabled device. Several ProSe enabled user equipments which are located in proximity to each other are operative to perform device-to-device (D2D) communication. D2D communication allows user equipments of a mobile communication network to directly communicate with each other when the user equipments are located in proximity to each other. D2D communication has a wide variety of applications, including public safety and other use cases. Emergency calls are one example for public safety use cases of D2D communication. Direct data or voice communication between user equipments is another example for use cases of D2D communication. For illustration, ProSe enabled user equipments located in proximity to each other may engage in data or voice communication.

In order to perform D2D communication, a user equipment must be capable of detecting one or several other user equipments which are located in proximity to the user equipment.

The resources, e.g. the subcarrier frequencies, slots and/or symbols which the user equipment may use for the D2D discovery may be allocated to the user equipment by a base station. Similarly, the resources, e.g. the subcarrier frequencies, slots and/or symbols which the user equipment may use for the D2D communication may be allocated to the user equipment by a base station. Transmission of data as D2D communication may involve scheduling assignments. A scheduling assignment may be used to determine in which resources, e.g. in which subcarrier frequencies, slots and/or symbols, a user equipment may transmit or receive data.

User equipments may perform D2D discovery and/or D2D communication even when they are located out of coverage of the cellular communication network. The resources for scheduling assignments or data resources may be preconfigured by the cellular communication network. The preconfigured resources available for D2D discovery and/or D2D communication in out-of-coverage scenarios may be limited, inter alia because the preconfigured resources must be in conformity with the radio access network resources of several adjacent cells of a cellular communication network.

SUMMARY OF THE INVENTION

There is a need in the art for techniques which mitigate at least some of the above shortcomings. There is in particular a need for techniques which address the shortcomings of the limitations imposed by pre-configured resources for device-to-device discovery and/or device-to-device communication in out-of-coverage scenarios. There is a need for such techniques which keep the risk that device-to-device discovery and/or device-to-device communication will cause interference with a radio access network of a cellular communication network moderate.

According to exemplary embodiments of the invention, the resources for device-to-device discovery and/or device-to-device communication are dynamically adjusted. These resources will be referred to as device-to-device resources in the following.

According to embodiments, an extension resource is dynamically made available for device-to-device discovery and/or device-to-device communication, if one or several user equipments are out of coverage or move out of coverage of the cellular communication network. The extension resource may be a resource reserved for communication with a radio access network of a cellular communication network when the user equipment(s) are in coverage or in partial coverage of a cell. Thereby, resources which are not needed in out of coverage scenarios are dynamically made available for device-to-device discovery and/or device-to-device communication. The problems associated with a shortage of device-to-device resources may be mitigated. The extension resources may include a number of subcarrier frequencies which is greater than the number of subcarrier frequencies of the pre-configured device-to-device resources.

The use of the extension resources may be performed selectively depending on whether one or all devices of a device-to-device group are located out of coverage or move out of coverage. The use of the extension resources may be performed selectively depending on a signal-to-noise-plus-interference-ratio (SINR) measured by all devices of the device-to-device group. The extension resource may be used only if the SINR for each device is less than a threshold. The threshold which is used for determining whether the extension resource may be used may be less than a further threshold for the SINR which determines whether the devices are in coverage.

A user equipment according to an embodiment comprises a wireless interface configured for communication with a cellular communication network. The user equipment comprises a processing device configured to control the wireless interface to use device-to-device resources for device-to-device discovery and/or device-to-device communication. The device-to-device resources are dependent on whether the user equipment is out of coverage of the cellular communication network.

The user equipment may be configured such that use of an extension resource for the device-to-device discovery and/or the device-to-device communication is selectively enabled if at least the user equipment moves out of coverage of the cellular communication network or is out of coverage of the cellular communication network.

When the use of the extension resource is enabled, resources taken from a resource pool constituted by the extension resource and preconfigured device-to-device resources may be used for performing the device-to-device discovery and/or the device-to-device communication.

The user equipment may be configured such that the use of the extension resource for the device-to-device discovery and/or the device-to-device communication is enabled if all devices of a device-to-device group move out of coverage of the cellular communication network or are out of coverage of the cellular communication network. The device-to-device group includes the user equipment.

The user equipment may be configured such that the use of the extension resource for the device-to-device discovery and/or the device-to-device communication is disabled if at least one device of the device-to-device group moves into coverage of the cellular communication network or is in coverage of the cellular communication network.

The user equipment may be configured to control the wireless interface to transmit information indicating that the user equipment moved out of coverage of the cellular communication network or that it is out of coverage of the of the cellular communication network.

The user equipment may be configured to receive a message at the wireless interface in response to the information, the message enabling the user equipment to use the extension resource for the device-to-device discovery and/or the device-to-device communication.

The user equipment may be configured to receive the message from a group head of the device-to-device group. The group head may thereby perform control signaling which causes all devices of the device-to-device group to use the extension resource.

The user equipment may be configured to receive another message from the group head of the device-to-device group which causes the user equipment to disable the use of the resource extension for the device-to-device discovery and/or the device-to-device communication. The group head may thereby perform control signaling which causes all devices of the device-to-device group to stop using the extension resource.

The user equipment may be configured to use the extension resource for communication with the cellular communication network if the use of the extension resource for the device-to-device discovery and/or the device-to-device communication is not enabled.

The user equipment may be configured to use the extension resource as scheduling assignment resource and as data resource. In this case, both the scheduling assignment resource for transmitting or receiving scheduling assignments and the data resource for transmitting or receiving data via device-to-device communication may be included in the extension resource.

The scheduling assignment resource and the data resource in the extension resource may be related to the original scheduling assignment resource and the original data resource, e.g. by an offset in frequency and/or time. The offset information may be preconfigured or may be signaled by a group head.

The user equipment may be configured to use the extension resource as data resource and to use a resource different from the extension resource as scheduling assignment resource. A scheduling assignment in the original pre-configured scheduling assignment resource may then be used to dynamically link the data resource in the extended resource with the original data resource in the pre-configured device-to-device resources.

The user equipment may be configured to trigger execution of at least one service in dependence on whether the use of the extension resource for the device-to-device discovery and/or the device-to-device communication is enabled. The at least one service may have bandwidth requirements which exceed a bandwidth threshold.

The at least one service may comprise a video call service.

The user equipment may be configured to operate as a group head of a device-to-device group. To this end, the user equipment may monitor whether devices of a device-to-device group are in coverage or out of coverage of a cellular communication network. The user equipment may enable all devices in the group to use an extension resource for device-to-device discovery and/or device-to-device communication if all devices of the device-to-device group are out of coverage. The user equipment may disable use of the extension resource for device-to-device discovery and/or device-to-device communication if any one of the devices of the device-to-device group is in coverage.

The user equipment may broadcast commands which enable and disable, respectively, the use of the extension resource for the device-to-device discovery and/or device-to-device communication.

The user equipment may perform dedicated signaling to enable and disable, respectively, the use of the extension resource for the device-to-device discovery and/or device-to-device communication.

According to another embodiment, a user equipment is provided which is configured to act as a group head of a device-to-device group. The user equipment comprises a wireless interface configured for communication with a cellular communication network. The user equipment is configured to receive, at the wireless interface, information from at least one further user interface which indicates whether the at least one further user equipment is in coverage or out of coverage of the cellular communication network. The user equipment is configured to control device-to-device resources used by the at least one further user equipment for device-to-device discovery and/or device-to-device communication in dependence on whether the at least one further user equipment is in coverage or out of coverage of the cellular communication network.

The user equipment may be configured to selectively enable a use of a resource extension for device-to-device discovery and/or device-to-device communication by the at least one further user equipment if the at least one further user equipment and the user equipment are both out of coverage of the cellular communication network.

The user equipment may be configured to selectively disable the use of the resource extension for device-to-device discovery and/or device-to-device communication by the at least one further user equipment if the at least one further user equipment or the user equipment are in coverage of the cellular communication network.

A communication system according to an embodiment comprises a device-to-device group. The device-to-device group comprises a plurality of devices configured for communication with a cellular communication network, each device of the device-to-device group being further configured for device-to-device discovery and device-to-device communication. At least one device of the device-to-device group is configured as a user equipment according to an embodiment.

The device-to-device group may comprise a group head. The group head may be configured to determine whether all devices of the device-to-device group move out of coverage of the cellular communication network or are out of coverage of the cellular communication network. The group head may be configured to selectively enable the plurality of devices to use an extension resource for the device-to-device discovery and/or the device-to-device communication.

The group head may be further configured to disable the use of the extension resource for the device-to-device discovery and/or the device-to-device communication if at least one device of the device-to-device group moves into coverage of the cellular communication network or is in coverage of the cellular communication network.

A method of controlling a user equipment according to an embodiment is provided. The user equipment comprises a wireless interface configured for communication with a cellular communication network. The method comprises determining whether the user equipment moves out of coverage or is out of coverage of the cellular communication network. The method comprises using device-to-device resources for a device-to-device discovery and/or device-to-device communication over the wireless interface, wherein the device-to-device resources are dependent on whether the user equipment moves out of coverage or is out of coverage of the cellular communication network.

The method may be performed by the user equipment or by a communication system according to an embodiment.

In the method, use of an extension resource for the device-to-device discovery and/or the device-to-device communication may be selectively enabled if at least the user equipment moves out of coverage of the cellular communication network or is out of coverage of the cellular communication network.

When the use of the extension resource is enabled, resources taken from a resource pool constituted by the extension resource and preconfigured device-to-device resources may be used for performing the device-to-device discovery and/or the device-to-device communication.

In the method, the use of the extension resource for the device-to-device discovery and/or the device-to-device communication may be enabled if all devices of a device-to-device group move out of coverage of the cellular communication network or are out of coverage of the cellular communication network. The device-to-device group includes the user equipment.

In the method, the use of the extension resource for the device-to-device discovery and/or the device-to-device communication may be disabled if at least one device of the device-to-device group moves into coverage of the cellular communication network or is in coverage of the cellular communication network.

The method may comprise transmitting, by the wireless interface of the user equipment, information indicating that the user equipment moved out of coverage of the cellular communication network or that the user equipment is out of coverage of the of the cellular communication network.

The method may comprise receiving, at the wireless interface, a message in response to the information. The message may enable the user equipment to use the extension resource for the device-to-device discovery and/or the device-to-device communication.

The message may be transmitted by a group head of the device-to-device group. The group head may thereby perform control signaling which causes all devices of the device-to-device group to use the extension resource.

The method may comprise receiving another message from the group head of the device-to-device group which causes the user equipment to disable the use of the resource extension for the device-to-device discovery and/or the device-to-device communication. The group head may thereby perform control signaling which causes all devices of the device-to-device group to stop using the extension resource.

The group head may transmit the other message disabling the use of the resource extension for the device-to-device discovery and/or the device-to-device communication when at least one device of the device-to-device group moves into coverage of the cellular communication network.

The method may comprise using the extension resource for communication with the cellular communication network if the use of the extension resource for the device-to-device discovery and/or the device-to-device communication is not enabled.

The extension resource may be used as scheduling assignment resource and as data resource. In this case, both the scheduling assignment resource for transmitting or receiving scheduling assignments and the data resource for transmitting or receiving data via device-to-device communication may be included in the extension resource.

In the method, the scheduling assignment resource and the data resource in the extension resource may be related to the original scheduling assignment resource and the original data resource, e.g. by an offset in frequency and/or time. The offset information may be preconfigured or may be signaled by a group head.

The extension resource may be used as data resource. A resource different from the extension resource may be used as scheduling assignment resource. A scheduling assignment in the original pre-configured scheduling assignment resource may then be used to dynamically link the data resource in the extended resource with the original data resource in the pre-configured device-to-device resources.

The method may comprise executing at least one service in dependence on whether the use of the extension resource for the device-to-device discovery and/or the device-to-device communication is enabled. The at least one service may have bandwidth requirements which exceed a bandwidth threshold.

The at least one service may comprise a video call service.

The method may comprise monitoring, by the user equipment, whether all devices of the device-to-device group are out of coverage of the cellular communication network.

The method may comprise transmitting, by the user equipment, a message enabling the use of the extension resource to the device-to-device group if all devices of the device-to-device group are out of coverage.

The method may comprise transmitting, by the user equipment, another message disabling the use of the extension resource to the device-to-device group if at least one device of the device-to-device group moves into coverage.

In the method, the user equipment may broadcast commands which enable and disable, respectively, the use of the extension resource for the device-to-device discovery and/or device-to-device communication.

In the method, the user equipment may perform dedicated signaling to enable and disable, respectively, the use of the extension resource for the device-to-device discovery and/or device-to-device communication.

In the methods, devices, and systems according to embodiments, a user equipment may be enabled to use an extension resource for the device-to-device discovery and/or the device-to-device communication. The device-to-device resources may thereby be dynamically increased when the user equipment, as well as other devices in the same device-to-device group, are out of coverage and cannot cause interference problems with a radio access network of a cellular communication network.

Although specific features described in the above summary and the following detailed description are described in the context of specific embodiments and aspects of the invention, the features of the embodiments and aspects may be combined with each other unless specifically noted otherwise.

BRIEF DESCRIPTION OF THE DRAWINGS

Embodiments of invention will now be described in more detail with reference to the accompanying drawings in which like or identical reference numerals designate like or identical elements.

DETAILED DESCRIPTION OF PREFERRED EMBODIMENTS

Figure 1:
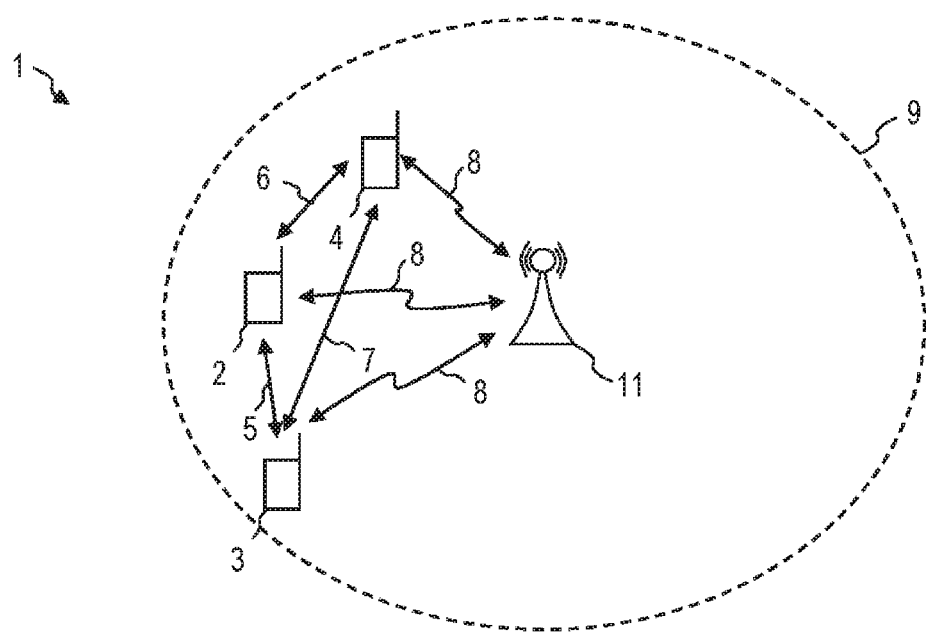
FIG. 1 shows a communication system according to an embodiment.

In the following, exemplary embodiments of the invention will be described in more detail. It has to be understood that the features of the various exemplary embodiments described herein may be combined with each other unless specifically noted otherwise. Identical or similar reference numerals refer to identical or similar components.

While exemplary embodiments will be described with reference to certain use cases for device-to-device (D2D) communication, it is to be understood that the techniques for D2D discovery and D2D communication may be used for a wide variety of use cases, including public safety use cases and other commercial use cases. While exemplary embodiments will be described in the context of certain cellular mobile communication networks, e.g. Long Term Evolution (LTE) networks, the embodiments are not described to such mobile communication techniques.

While exemplary embodiments will be described with reference to a base station which pre-configured device-to-device resources, it is to be understood that a user equipment may receive information on the pre-configured device-to-device resources also from a repeater relay or another user equipment which acts as a group head for D2D communication, for example.

FIG. 1 shows a communication system 1 according to an embodiment. The communication system 1 includes a mobile communication system which is configured as a cellular communication network. The cellular communication network may comprise a plurality of base stations, each serving a cell. A base station 11 and an associated cell 9 are schematically shown in FIG. 1. The base stations may communicate with each other via wireless radio communications or via an operator core network. The cellular communication network may be a Long Term Evolution (LTE) network. A radio access network (RAN) of the cellular communication network may be an evolved UTRAN (E-UTRAN), with the base station 11 being an evolved Node B (eNodeB). The base stations may be connected to a Mobility Management Entity (MME) and/or Serving Gateway (S-GW) in the operator core network.

The base station 11 provides a radio cell 9 in which user equipments (UEs) 2, 3, 4 may communicate directly with the base station 11 via radio communication 8. The UEs 2, 3, 4 may respectively have a wireless interface for communication with the RAN of the cellular communication network.

At least one of the UEs 2, 3, 4 is capable of performing a D2D discovery and D2D communication. According to the terminology in the pertinent field of the art, the term D2D communication refers to a radio communication between UEs which is performed directly between the UEs. The radio signals 5, 6, 7 transmitted in the D2D discovery and/or D2D communication may not be processed by the base station of the cellular communication network. The radio signals 5, 6, 7 transmitted in the D2D discovery and/or D2D communication may not pass the RAN of the cellular communication network. The radio signals 5, 6, 7 transmitted in the D2D discovery and/or D2D communication may not be processed by a core network of the wireless cellular communication network. The UEs which are configured for D2D discovery and D2D communication may use the same wireless interface for communicating with the RAN and for D2D purposes. A UE configured for D2D discovery and D2D communication may also be referred to as Proximity Service (ProSe)-enabled UE in the art.

The UEs 2, 3, 4 which are configured for D2D discovery and/or D2D communication may use pre-configured resources for a D2D discovery signal transmission and/or for D2D communication. For illustration, at least resources for scheduling assignments may be pre-configured by the cellular communication network. The pre-configured resources may be preconfigured in the UEs 2, 3, 4 by the base station 11, by a repeater relay or by another UE. The pre-configured resources for the D2D discovery and/or D2D communication may respectively be allocated by the base station 11 by a broadcast or multicast message or by dedicated signaling. For illustration, the UEs 2, 3, 4 may respectively receive information on the allocated resources for the D2D discovery signal transmission in a system information block (SIB) which may be transmitted by the cellular communication network. Alternatively, dedicated signaling may be used.

In the following, the resources which may be used by UEs 2, 3, 4 for D2D discovery and/or D2D communication will also be referred to as device-to-device resources. The D2D resources may include the resources which are pre-configured by the cellular communication network. As will be explained in more detail with reference to FIG. 1 to FIG. 14 in the following, the device-to-device resources may be dynamically adjusted depending on how UE(s) are positioned relative to the coverage area of the cellular communication network.

For illustration, use of an extension resource may be dynamically enabled if all UEs 2, 3, 4 which are included in a device-to-device group are out of coverage or move out of coverage of the cellular communication network.

Use of the extension resource may be disabled if one or several of the UEs 2, 3, 4 move into coverage or are located in coverage of the cellular communication network. In this case, the extension resource may be kept free from D2D discovery signaling and/or D2D communication and may be used for communication with the RAN of the cellular communication network.

The extension resource may be an extension Out of Coverage (OoC) resource which is selectively used for D2D discovery and/or D2D communication only if UEs are out of coverage of the cellular communication network. The extension resource may be selectively used for D2D discovery and/or D2D communication only if all UEs are out of coverage of the cellular communication network and are unlikely to cause interference with the RAN when using the extension resource.

Figure 2:
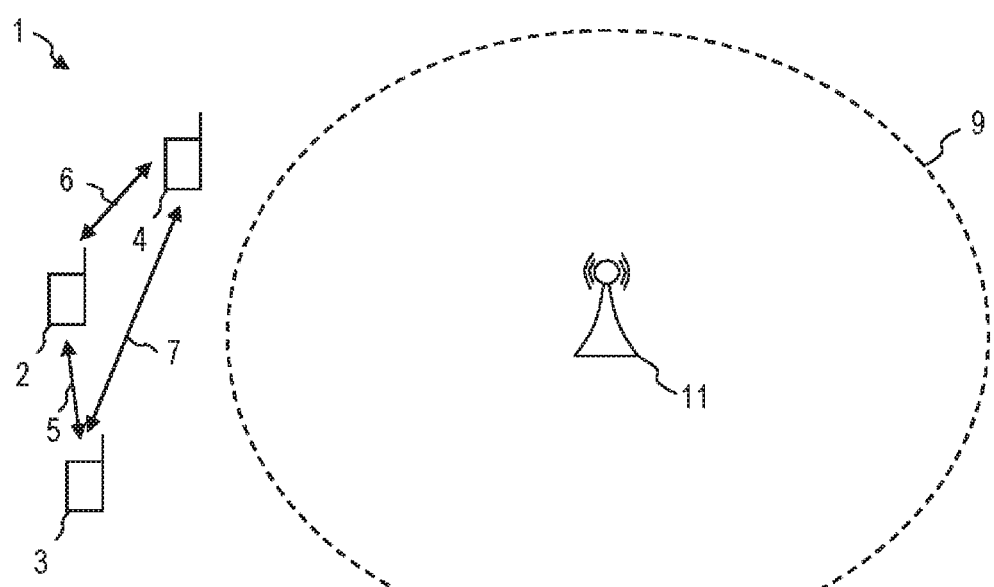
FIG. 2 shows the communication system of FIG. 1 in which all devices of a device-to-device group are out of coverage.
Figure 3:
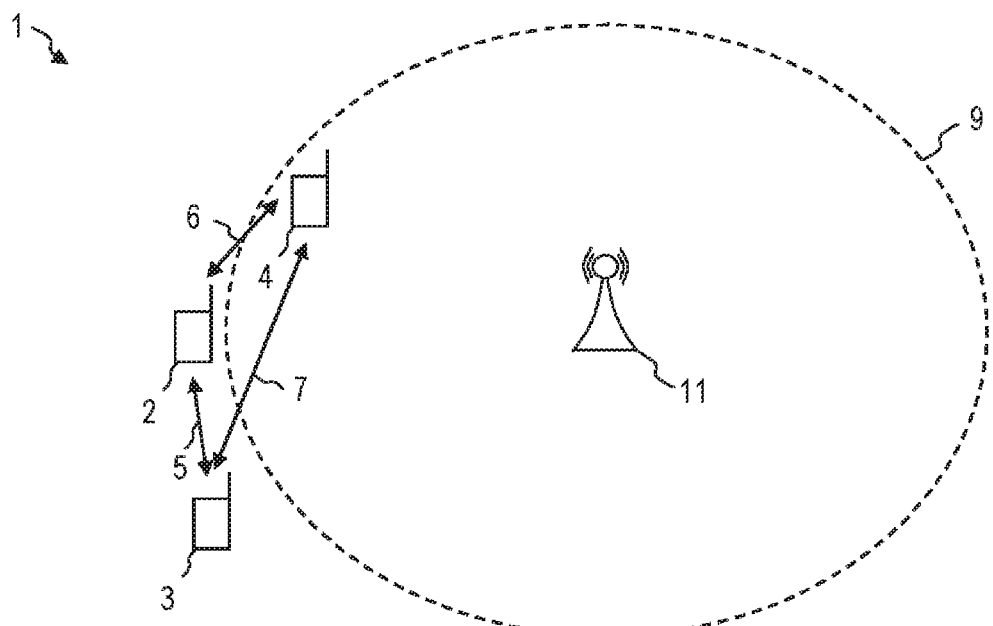
FIG. 3 shows the communication system of FIG. 1 in which a device of the device-to-device group is in coverage.

FIG. 1 to FIG. 3 illustrate different conditions of a communication system according to an embodiment. A plurality of UEs 2, 3, 4 may form a device-to-device group.

FIG. 1 shows a condition in which the UEs 2, 3, 4 of the device-to-device group are all located in coverage of the cellular communication system. Device-to-device resources may be pre-configured by the cellular communication network via radio signaling. The device-to-device resources may be pre-configured to the case in which one or several of the UEs 2, 3, 4 move out of coverage.

FIG. 2 shows a condition in which the UEs 2, 3, 4 of the device-to-device group are all located out of coverage of the cellular communication system. In this case, use of an extension resource for the D2D discovery and/or D2D communication. The extension resource may be used for the D2D discovery and/or D2D communication in addition to the original pre-configured D2D resource.

Different techniques may be used to combine the extension resource with the original pre-configured D2D resource. For illustration, the extension resource may be used for both scheduling assignments and data. There may be a relation between the resources in the extension resource and the original pre-configured D2D resource which link the resources in the extension resource to those in the original pre-configured D2D resource. For further illustration, the extension resource may be used for data only, with all scheduling assignments being kept in the original pre-configured D2D resource. The scheduling assignment in the original pre-configured D2D resource then provides a link to the extension resource in which the respective data is transmitted.

FIG. 3 shows a condition in which at least one of the UEs moved into coverage of the cellular communication network. The use of the extension resource for the D2D discovery and/or D2D communication may be disabled for all UEs 2, 3, 4 of the group. The D2D discovery and/or D2D communication may be limited to the pre-configured resources. The extension resources are again made available for communication with the radio access network.

The extension resources may include a number of resource blocks in the time-frequency resource grid which is greater than the number of resource blocks of the original pre-configured D2D resource. The extension resources may include a number of sub carrier frequencies in the time-frequency resource grid which is greater than the number of subcarrier frequencies in the original pre-configured D2D resource.

Different techniques may be used to enable the UEs 2, 3, 4 of a device-to-device group to adapt the D2D resources depending on whether or not all UEs 2, 3, 4 of the device-to-device group are located out of coverage of the cellular communication network.

In some implementations, a UE 3 of the device-to-device group may act as a group head. The UE 3 which acts as a group head may receive reports from the other UEs 2, 4 in the group which indicate whether the respective other UEs 2, 4 are in coverage or out of coverage. A signal quality indicator for the RAN signal strength may be included in the report. For illustration, a signal-to-noise-plus-interference-ratio (SINR) measured by the other UEs 2, 4 may be reported to the UE 3 which acts as the group head.

If all UEs are out of coverage, the UE 3 which acts as group head may use one-to-many or one-to-one signaling to enable the other UEs 2, 4 in the group to start using the extension resource for the D2D discovery and/or D2D communication. Additional criteria may be used for determining whether the use of the extension resource for the D2D discovery and/or D2D communication is to be enabled. For illustration, the SINR measured by each UE 2, 3, 4 of the device-to-device group may be compared to an activation threshold which is less than a threshold at which a suitable cell is detected. The use of the extension resource for the D2D discovery and/or D2D communication may be selectively enabled only if the SINR for each UE 2, 3, 4 of the device-to-device group is less than the activation threshold. Likewise, the use of the extension resource for the D2D discovery and/or D2D communication may be disabled if the SINR detected by at least one of the UEs 2, 3, 4 exceeds the activation threshold.

Alternatively or additionally to enabling and disabling the use of the extension resource by the group head, each UE 2, 3, 4 may broadcast information on whether it is in coverage or out of coverage to all other UEs 2, 3, 4 in the same device-to-device group. Each UE 2, 3, 4 may keep track of the status of all other UEs 2, 3, 4 in the device-to-device group. If all UEs of the same device-to-device group are out of coverage, each UE may start using the extension resource for the D2D discovery and/or D2D communication. If one UE of the same device-to-device group moves back into coverage, all UEs of the device-to-device group may disable the use of the extension resource for the D2D discovery and/or D2D communication.

Figure 4:
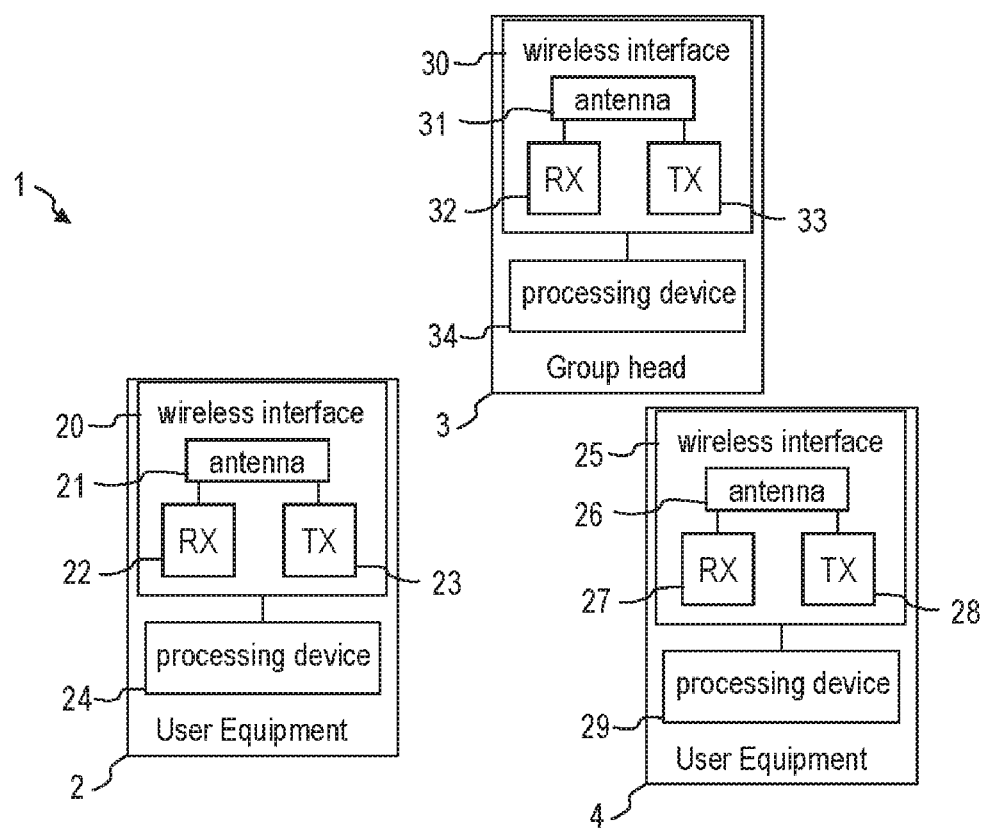
FIG. 4 is a block diagram representation of a communication system according to an embodiment.

FIG. 4 is a schematic block diagram of a communication system 1 according to an embodiment.

The UE 2 has a wireless interface 20. The wireless interface 20 may be configured to communicate with the RAN 10. The wireless interface 20 may be configured for communication over the E-UTRA air interface.

The UE 2 has a processing device 24 connected to the wireless interface 20. The processing device 24 may comprise one or several microprocessors, one or several microcontrollers, one or several processors, one or several controllers, one or several application specific integrated circuits (ASICs) and/or a combination of such devices.

The processing device 24 may be configured to retrieve information on pre-configured D2D resources from signaling received at the wireless interface 20 from the cellular communication network. The processing device 24 may be configured to control which resources are to be used for the D2D discovery and/or D2D communication. The processing device 24 may be configured to selectively enlarge the amount of D2D resources compared to the original pre-configured resources if all UEs 2, 3, 4 in a device-to-device group are out of coverage or move out of coverage of the cellular communication network. The processing device 24 may be configured to selectively limit the D2D resources to the original pre-configured resources if one of the UEs 2, 3, 4 moves into coverage of the cellular communication network.

The processing device 24 may be configured to control a transmitter path 23 of the wireless interface 20 to transmit a D2D discovery signal to the further UE 3 via an antenna 21 to indicate that the UE 2 is looking for a further UE for D2D communication and/or to indicate that the UE 2 would be capable of performing D2D communication. The processing device 24 may be configured to use resources selected from the D2D resources for the transmission, which depend on whether or not the UE 2 and other UEs 3, 4 in the same group are in coverage or out of coverage. The processing device 24 may be coupled to a receiver path 22 of the wireless interface 20 to process a message received from a group head 3 or another UE 4 of the device-to-device group. For illustration, the processing device 24 may decode signaling from the group head 3 and/or the other UE 4 to determine whether the use of an extension resource may be enabled for the D2D discovery and/or the D2D communication.

The UE 3 acting as group head and the other UE 4 may have a configuration and operation which generally corresponds to the configuration and operation explained for the UE 2. The UE 3 may comprise a wireless interface 30 configured for communication with the RAN and the UEs 2, 4. The wireless interface 30 may comprise an antenna 31, a receiver path 32 and a transmitter path 32. The UE 3 acting as group head may comprise a processing device 34 coupled to the wireless interface 30.

The processing device 34 may be configured to determine whether all UEs 2, 3, 4 of the device-to-device group are out of coverage. The processing device 34 may be configured to control the wireless interface to selectively enable the UEs 2, 4 to use the extension resource for D2D discovery and/or D2D communication in dependence on whether all UEs 2, 3, 4 are out of coverage. The processing device 34 may be configured to determine whether at least one of the UEs 2, 3, 4 of the device-to-device group is in coverage of the cellular communication network. The processing device 34 may be configured to control the wireless interface to selectively disable the use the extension resource for D2D discovery and/or D2D communication in dependence on whether at least one of the UEs 2, 3, 4 is in coverage.

The other UE 4 may have a configuration and operation which generally corresponds to the configuration and operation explained for the UE 2. The UE 4 may comprise a wireless interface 25 configured for communication with the RAN and the UEs 3, 4. The wireless interface 25 may comprise an antenna 26, a receiver path 27 and a transmitter path 28. The UE 4 may comprise a processing device 29 coupled to the wireless interface 25 which may be configured as explained for the processing device of the UE 2.

Figure 5:
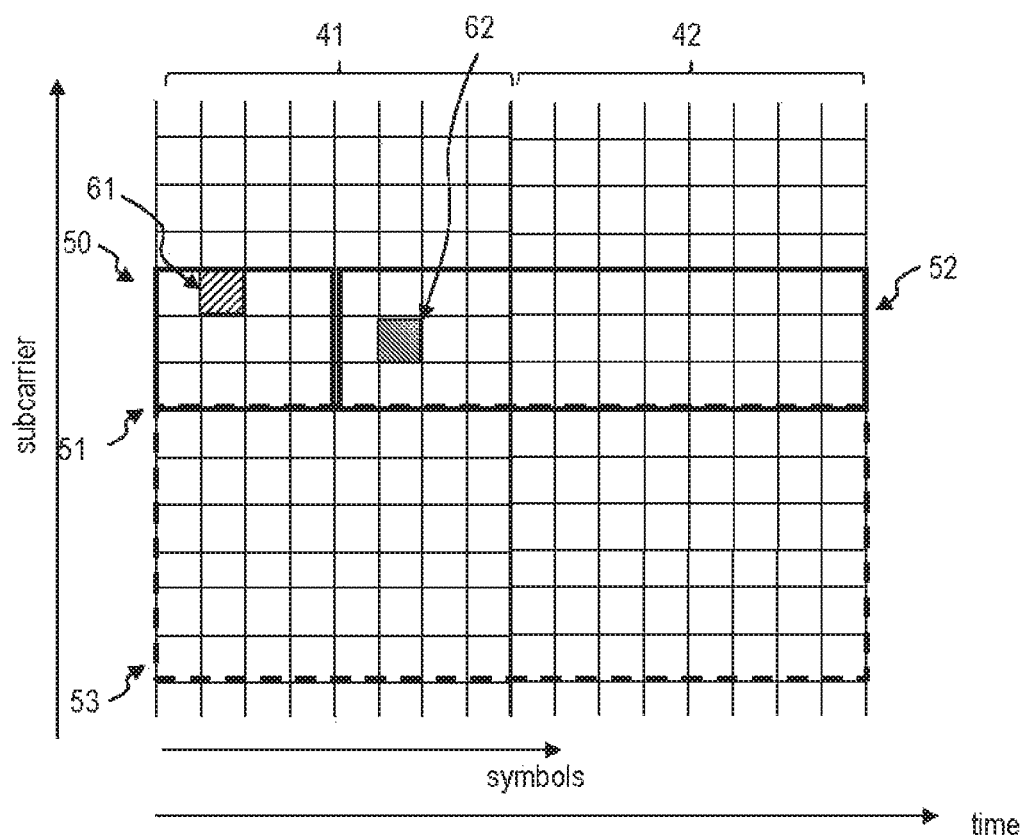
FIG. 5 is a diagram illustrating resources for device-to-device discovery and/or device-to-device communication when use of an extension resource is not enabled.

FIG. 5 illustrates a time-frequency resource grid. The resources may be subdivided in the time domain, e.g. into frames 41, 42, and in the frequency domain. A plurality of subcarrier frequencies may be available in the frequency domain.

D2D resources 50 may be pre-configured and stored in UE, for example in a Universal Integrated Circuit Card (UICC), or may be stored by the cellular communication network. An extension resource 53 may only be used for D2D discovery and/or D2D communication when a pre-defined criterion is fulfilled, e.g. when all UEs of a device-to-device group are out of coverage of the cellular communication network, and/or when users are within certain geo-location area. While at least one UE of the device-to-device group is in coverage or in partial coverage, the extension resource 53 may be kept free from D2D discovery and/or D2D communication to prevent interference with cellular communication network signaling and data transmissions.

The D2D resources 50 may include a scheduling assignment (SA) resource 51. Scheduling assignments may be transmitted in the SA resource 51. The D2D resources 50 may include a data resource 52 for data transmissions. Data may be transmitted in a subcarrier frequency and symbol 62 of the data resource 52. The subcarrier frequency and symbol 62 may be specified by the associated scheduling assignment 61 in the SA resource 51.

Figure 6:
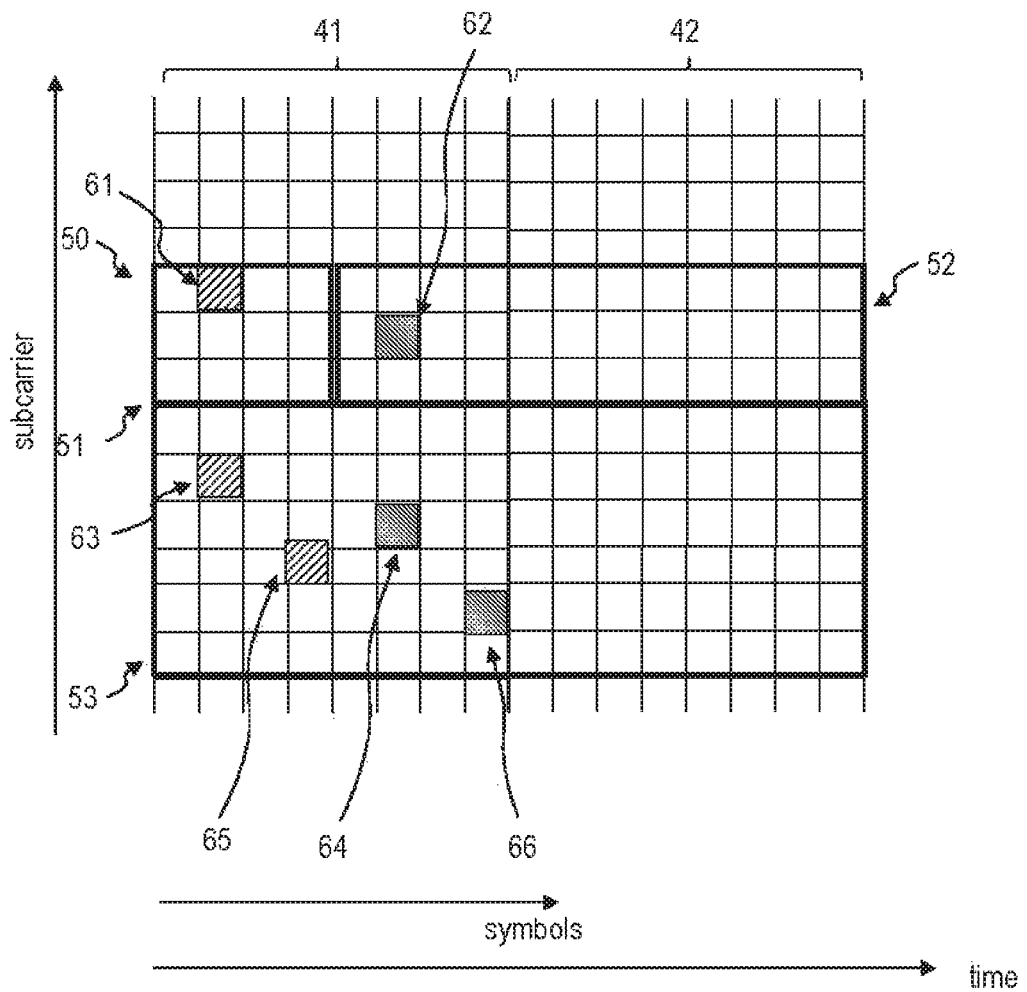
FIG. 6 is a diagram illustrating resources for device-to-device discovery and/or device-to-device communication when use of the extension resource is enabled.

FIG. 6 illustrates one way of using the time-frequency resource grid when all UEs of the device-to-device group are out of coverage.

The D2D resources are dynamically extended to include the extension resource 53 in addition to the preconfigured original D2D resource 50. In the resource usage scheme shown in FIG. 6, the extension resource 53 may be used both as a SA resource and a data resource. A scheduling assignment 63 may be transmitted in the extension resource 53. The associated data may be transmitted in a subcarrier frequency and symbol 64 of the extension resource 53.

The subcarrier frequencies and/or symbols 63, 64, 65, 66 of the extension resource 53 which are used for scheduling assignment transmission and data transmission may be linked to the respective subcarrier frequencies and/or symbols 61, 62 of the original pre-configured D2D resource 50. For illustration, the subcarrier frequencies and/or symbols 63, 64, 65, 66 of the extension resource 53 which are used for scheduling assignment transmission and data transmission may have a frequency and/or time offset relative to the respective subcarrier frequencies and/or symbols 61, 62 in the original pre-configured D2D resource 50.

The SA resource 61 and data resources 62 in the preconfigured original D2D resource 50 may be linked to each other by a one-to-one mapping. For illustration, there may be a one-to-one mapping which links the data resource 62 to the SA resource 61 in the time-frequency resource grid of the preconfigured original D2D resource 50. This mapping may be re-used for the extension resource 53. I.e., the extension resource 53 may reuse the mapping between the SA resource and data resource in the time-frequency resource grid known from the preconfigured original D2D resource 50, so as to carry over this mapping to the extension resource 53. The mapping may include offsets in frequency and/or time. For illustration, SA resource 63 and data resource 64 may have a first offset in time and/or frequency compared to the SA resource 61 and data resource 62 in the preconfigured original D2D resource 50. SA resource 65 and data resource 66 may have a second offset in time and/or frequency compared to the SA resource 61 and data resource 62 in the preconfigured original D2D resource 50. The offset(s) may be preconfigured. The offset(s) may be signaled by a group head of the device-to-device group, for example.

Figure 7:
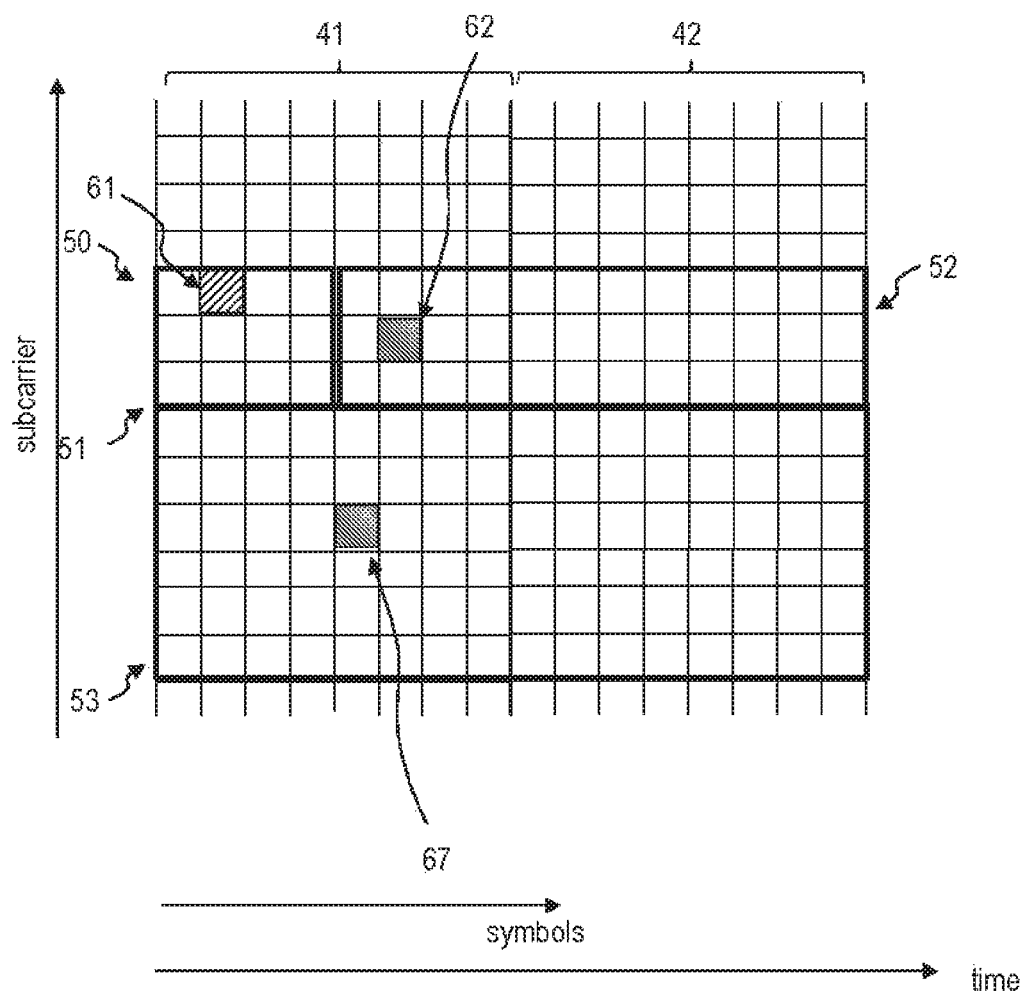
FIG. 7 is a diagram illustrating resources for device-to-device discovery and/or device-to-device communication when use of the extension resource is enabled.

FIG. 7 illustrates another way of using the time-frequency resource grid when all UEs of the device-to-device group are out of coverage.

The D2D resources are dynamically extended to include the extension resource 53 in addition to the original preconfigured D2D resource 50. In the resource usage scheme shown in FIG. 7, the extension resource 53 may be used as a data resource. Scheduling assignments are not transmitted in the extension resource 53, but are kept in the original pre-configured D2D resource 50. The scheduling assignment 61 may provide a link to the extension resource 53, e.g. by indicating the subcarrier frequencies and/or symbols 67 of the extension resource 53 which are used for the data transmission.

The UEs according to embodiments may be configured both for a use of the extension resource 53 for SA and data transmissions, as explained with reference to FIG. 6, and for the use of the extension resource 53 for data transmissions only, as explained with reference to FIG. 7.

Information on which scheme of using the extension resource 53 is employed may be included in a scheduling assignment. For illustration, one information bit or a plurality of information bits may indicate whether normal scheduling is performed in which the scheduling assignment is kept in the original pre-configured D2D resource 50 or whether extended scheduling is performed in which the scheduling assignment may also be included in the extension resource 53. In response to receiving such a scheduling assignment from a group head, for example, the UE 2, 4 will be able to determine whether future scheduling assignments will be received on the original preconfigured D2D resource 50 only or whether they may also be included in the extension resource 53.

Figure 8:
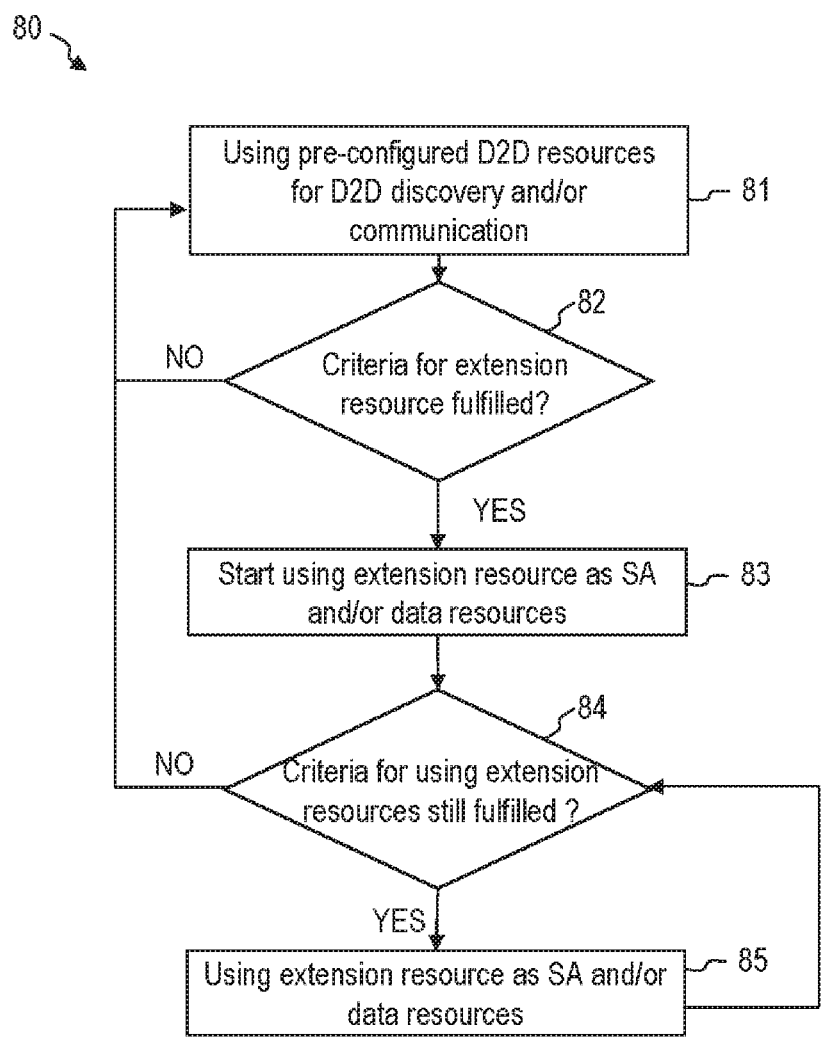
FIG. 8 is a flow chart of a method according to an embodiment.

FIG. 8 is a flow chart of a method 80 according to an embodiment. The method 80 may be performed by a user equipment according to an embodiment.

At 81, the user equipment may use pre-configured D2D resources for performing D2D discovery and/or D2D communication. The user equipment may be in coverage while using the pre-configured D2D resources for performing D2D discovery and/or D2D communication.

At 82, the user equipment may determine whether criteria are fulfilled for enabling the use of an extension resource in addition to the pre-configured D2D resource for performing D2D discovery and/or D2D communication. Various techniques may be used to perform the determining at 82. The user equipment may monitor whether all other user equipments included in the same device-to-device group are out of coverage of the cellular communication network. The user equipment may evaluate its own SINR or other quality indicators for network quality to determine whether the use of the extension resource for performing D2D discovery and/or D2D communication is to be enabled. The user equipment may evaluate a SINR or other quality indicators for network quality reported to the user equipment by other user equipments, e.g. the other user equipments in the same group, to determine whether the use of the extension resource for performing D2D discovery and/or D2D communication is to be enabled. The user equipment may evaluate whether any suitable cell around which may generate interference. The user equipment may monitor signaling from a group head of the device-to-device group to determine whether the use of the extension resource is selectively enabled. The user equipment may evaluate one or several pre-defined geo-location constraints based on its location. If the criteria are not fulfilled, the user equipment may continue using only the pre-configured D2D resource at 81.

At 83, if the criteria for using the extension resource for D2D discovery and/or D2D communication are fulfilled, the user equipment may start using the extension resource for D2D discovery and/or D2D communication. The user equipment may determine based on a scheduling assignment received from a group head, for example, whether the scheduling assignments may also be included in the resource extension. The user equipment may selectively monitor the extension resource for scheduling assignments depending on whether the scheduling assignments may also be included in the resource extension. Data may be retrieved from subcarrier frequencies and symbols in either the original pre-configured D2D resource or the extension resource, as specified by the scheduling assignment.

At 84, the user equipment may determine whether the criteria for using the extension resource in addition to the pre-configured D2D resource for performing D2D discovery and/or D2D communication are still fulfilled. This may be implemented in any one of the ways described with reference to 82. For illustration, the user equipment may monitor whether any one of the other user equipments in the device-to-device groups moves into coverage. The user equipment may listen for signaling from a group head of the device-to-device group to determine whether the use of the extension resource is disabled. The user equipment may monitor whether itself moves into coverage. If the criteria are not fulfilled, the user equipment may again use only the pre-configured D2D resource for D2D discovery and/or D2D communication at 81.

At 85, if the criteria for using the extension resource are still fulfilled, the user equipment may continue using the extended D2D resource which includes both the original pre-configured D2D resource and the extension resource.

Figure 9:
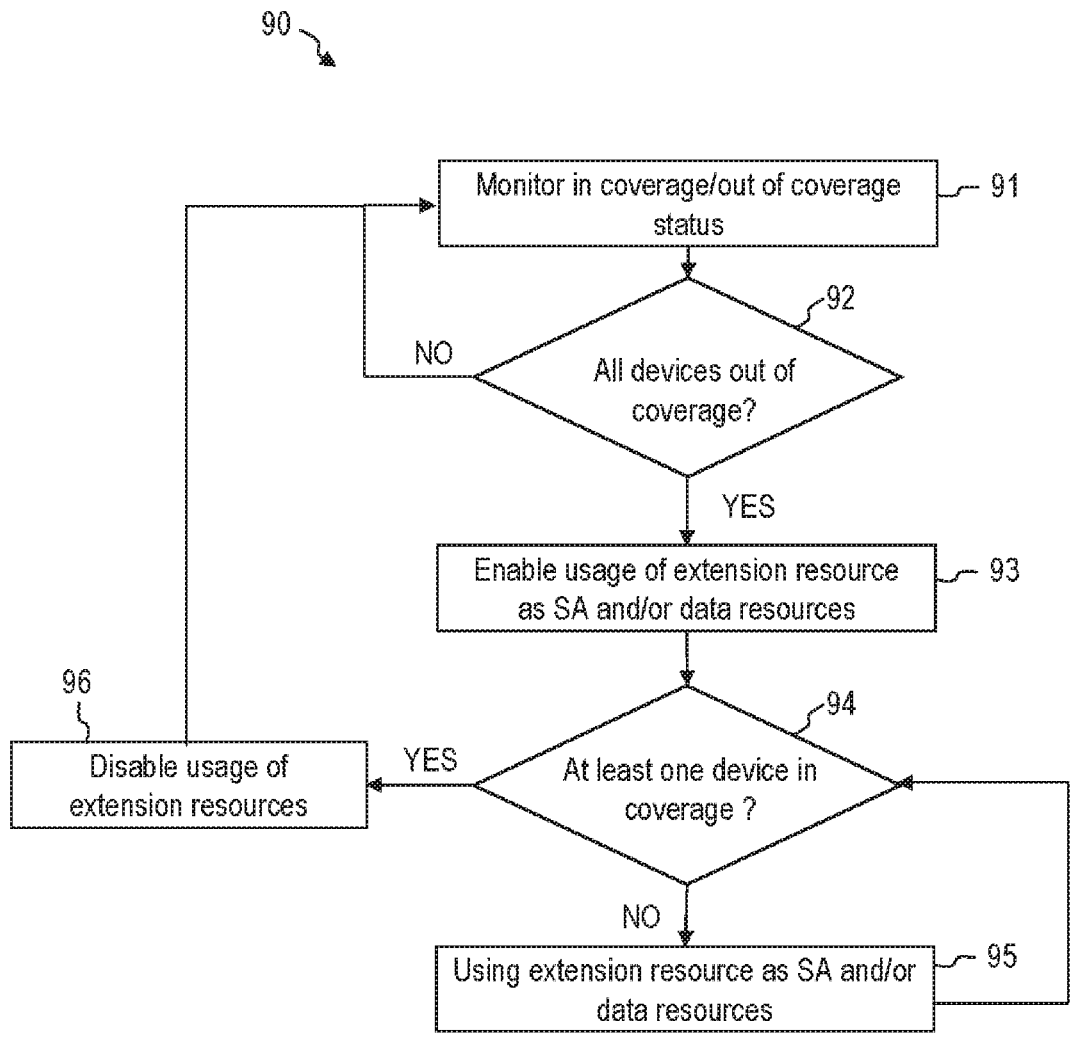
FIG. 9 is a flow chart of a method according to an embodiment.

FIG. 9 is a flow chart of a method 90 according to an embodiment. The method 90 may be performed by a user equipment according to an embodiment. The user equipment may be included in a device-to-device group. The device-to-device group may comprise a plurality of devices capable of performing D2D communication with each other. The method 90 may be performed by a user equipment which does not act as a group head of the device-to-device group or may be performed by a user equipment which acts as the group head. The devices of the device-to-device group may use the same wireless interfaces for performing D2D communication with each other and for communication with a cellular communication network.

At 91, the user equipment may monitor which devices of the device-to-device group are in coverage of the cellular communication network and which devices of the device-to-device group are out of coverage of the cellular communication network. All devices of the device-to-device group may broadcast information on whether they are in coverage or out of coverage. Alternatively, all devices of the device-to-device group may perform one-to-one signaling to report information on whether they are in coverage or out of coverage to the group head. The information may include a signal quality indicator, e.g. a SINR measured by the respective device of the device-to-device group.

At 92, the user equipment may determine whether all devices of the device-to-device group are out of coverage of the cellular communication network. If at least one device is not out of coverage, the monitoring may be continued at 91.

At 93, if all devices of the device-to-device group are out of coverage of the cellular communication network, use of the extension resource is enabled. The extension resource may be used as scheduling assignment resource and data resource. The extension resource may be used as data resource only, with the scheduling assignments being still included in the original pre-configured D2D resource.

At 94, the user equipment may determine whether at least one device of the device-to-device group moved back into coverage of the cellular communication network.

At 95, if none of the devices of the device-to-device group moved back into coverage of the cellular communication network, the extension resource may be continued to be used as data resource and, optionally, also as SA resource. The method may return to 94.

At 96, if the at least one device of the device-to-device group moved back into coverage of the cellular communication network, the use of the extension resource for D2D discovery and/or D2D communication may be disabled. All scheduling assignments and data transmissions are done using the original pre-configured D2D resource only.

Different techniques may be used by a user equipment to dynamically adjust the device-to-device resources. Exemplary implementations will be explained in more detail with reference to the signaling diagrams of FIG. 10 and FIG. 11.

Figure 10:
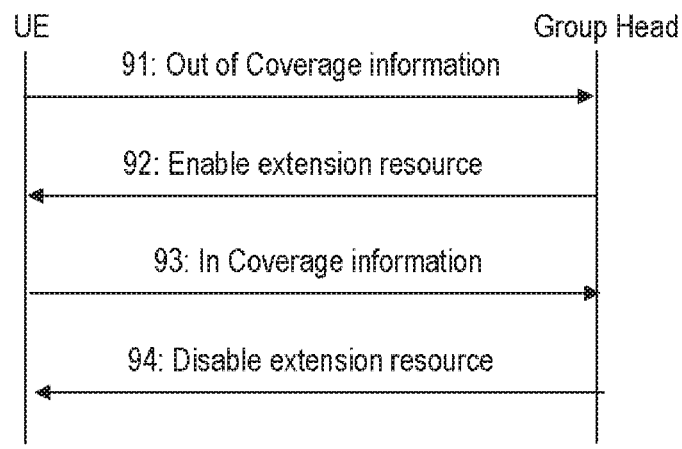
FIG. 10 is a diagram which shows a signaling in a communication system according to an embodiment.
Figure 11:
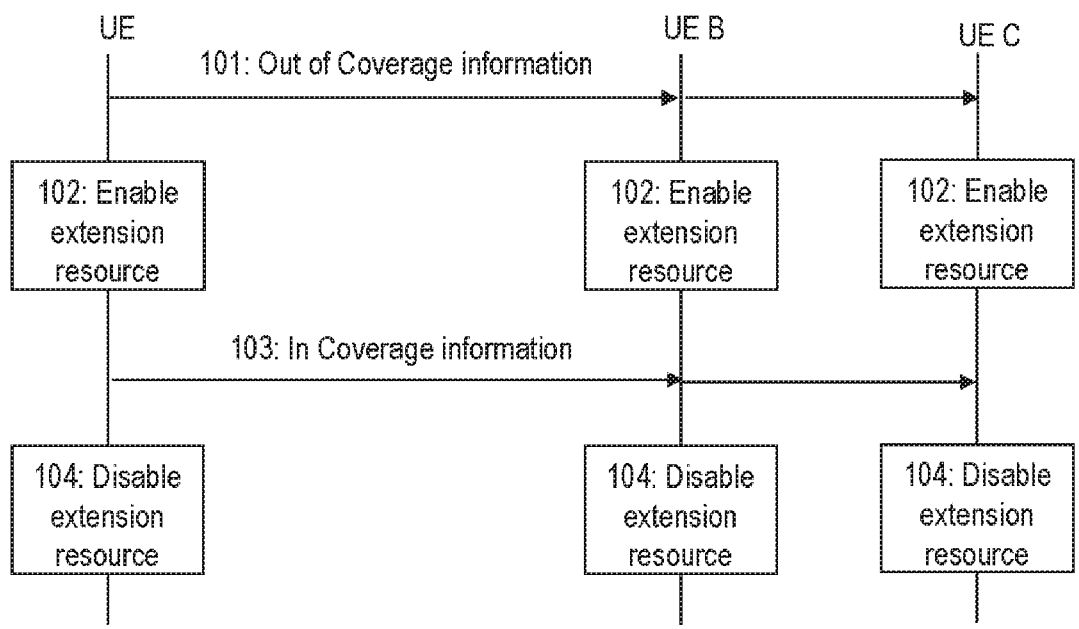
FIG. 11 is a diagram which shows a signaling in a communication system according to an embodiment.

FIG. 10 is a diagram illustrating a signaling used for controlling the device-to-device resources for D2D discovery and/or D2D communication. A user equipment, UE, performs D2D signaling with another UE which acts as group head.

In response to detecting that the UE is out of coverage or moves out of coverage, the UE transmits out of coverage information 91. The out of coverage information 91 may be transmitted via the same interface which is configured for communication with the RAN. The out of coverage information 91 may be transmitted directly to the group head. The out of coverage information 91 may be transmitted as one-to-one message.

If all other devices of the device-to-device group are also out of coverage, the UE receives a message 92 from the group head. The message 92 enables the use of the extension resource for D2D discovery and/or D2D communication. The message 92 may be selectively generated by the group head if all devices of the device-to-device group are out of coverage or move out of coverage. The out of coverage information 91 may be transmitted as one-to-one message. The message 92 may be broadcast to the device-to-device group. The message 92 may be as one-to-one message.

In response to detecting that the UE is in coverage or moves into coverage, the UE transmits in coverage information 93. The in coverage information 93 may be transmitted via the same interface which is configured for communication with the RAN. The in coverage information 93 may be transmitted directly to the group head. The in coverage information 93 may be transmitted as one-to-one message.

Receipt of the in coverage information 93 triggers the group head to terminate the use of the extension resource for D2D communication and/or D2D discovery for the whole device-to-device group. The group head may broadcast another message 94 to the device-to-device group to disable the use of the extension resource for D2D communication and/or D2D discovery.

While an in coverage event is illustrated for the UE in FIG. 10, the use of the extension resource for D2D communication and/or D2D discovery will also be terminated when any other device of the device-to-device group moves into coverage of the cellular communication network.

FIG. 10 is a diagram illustrating a signaling used for controlling the device-to-device resources for D2D discovery and/or D2D communication. A user equipment, UE, performs D2D signaling with other UEs denoted as UE B and UE C in FIG. 11.

In response to detecting that the UE is out of coverage or moves out of coverage, the UE transmits out of coverage information 101. The out of coverage information 101 may be transmitted via the same interface which is configured for communication with the RAN. The out of coverage information 101 may be broadcast to all devices in the device-to-device group.

If all other devices of the device-to-device group are also out of coverage, the detection that the last UE also moved out of coverage will trigger all devices in the group to enable use of the extension resource for D2D discovery and/or D2D communication at 102. No dedicated signaling from a group head is required in this case. The UEs may themselves monitor whether all UEs of the group are out of coverage.

In response to detecting that the UE is in coverage or moves into coverage, the UE transmits in coverage information 103. The in coverage information 103 may be transmitted via the same interface which is configured for communication with the RAN. The out of coverage information 103 may be broadcast to all devices in the device-to-device group.

If any one of the devices of the device-to-device group moves into coverage, this will trigger all devices in the group to disable the use of the extension resource for D2D discovery and/or D2D communication at 104. No dedicated signaling from a group head is required in this case. The UEs may themselves detect that at least one of the UEs moved into coverage of the cellular communication network.

The user equipment according to embodiments may support services which can be performed using D2D communication. The set of supported services may be adapted depending on whether the extension resource is available for D2D communication. For illustration, voice telephony via D2D communication may be supported even when the extension resource is not available for D2D communication. Video telephony or high definition video telephony may be selectively supported only if the extension resource is available for D2D communication, e.g., when all devices of the group are out of coverage.

Figure 12:
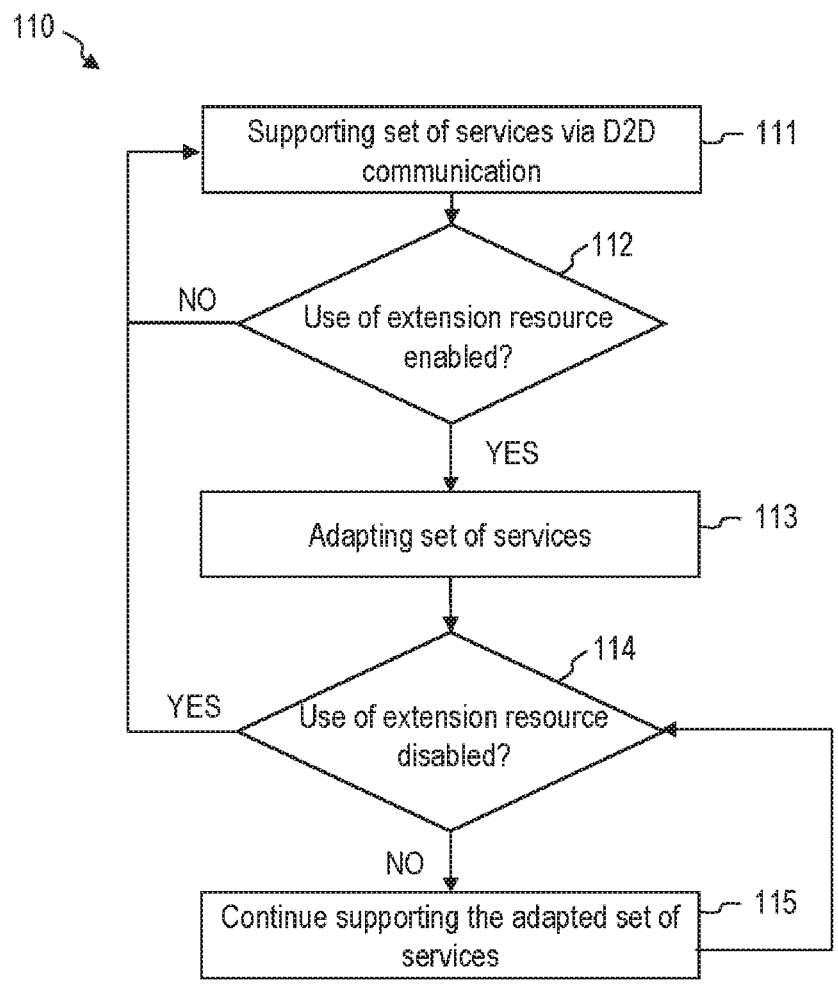
FIG. 12 is a flow chart of a method according to an embodiment.

FIG. 12 is a flow chart of a method 110 according to an embodiment. The method 110 may be performed by a user equipment according to an embodiment.

At 111, a set of services is supported which rely upon D2D communication. The services may include low data rate services. Other services having bandwidth or data rate requirements which exceed a threshold criterion may not be supported at 111. High definition video telephony may be exemplary for such a service having high bandwidth requirements.

At 112, it is determined whether the use of the extension resource for D2D communication is enabled. If the use of the extension resource is not enabled for D2D communication, the method may return to the state 111.

At 113, if the use of the extension resource for D2D communication is enabled, the set of supported services may be adapted. Other services may be included in the set of supported services. For illustration, other services having bandwidth or data rate requirements which exceed a threshold criterion may be included in the set of services for execution. Video telephony may be included in the adapted set at 113. High definition video telephony may be included in the adapted set at 113.

At 114, it is determined whether the use of the extension resource for D2D communication is enabled. If the use of the extension resource is not disabled for D2D communication, the adapted set of services may still be supported at 115. The method may return to the monitoring 114. If the use of the extension resource is disabled for D2D communication, the method may return to 111. In this case, the extension resource is again kept clear of D2D discovery and D2D communication, in order to mitigate the risk of interference with the RAN.

Figure 13:
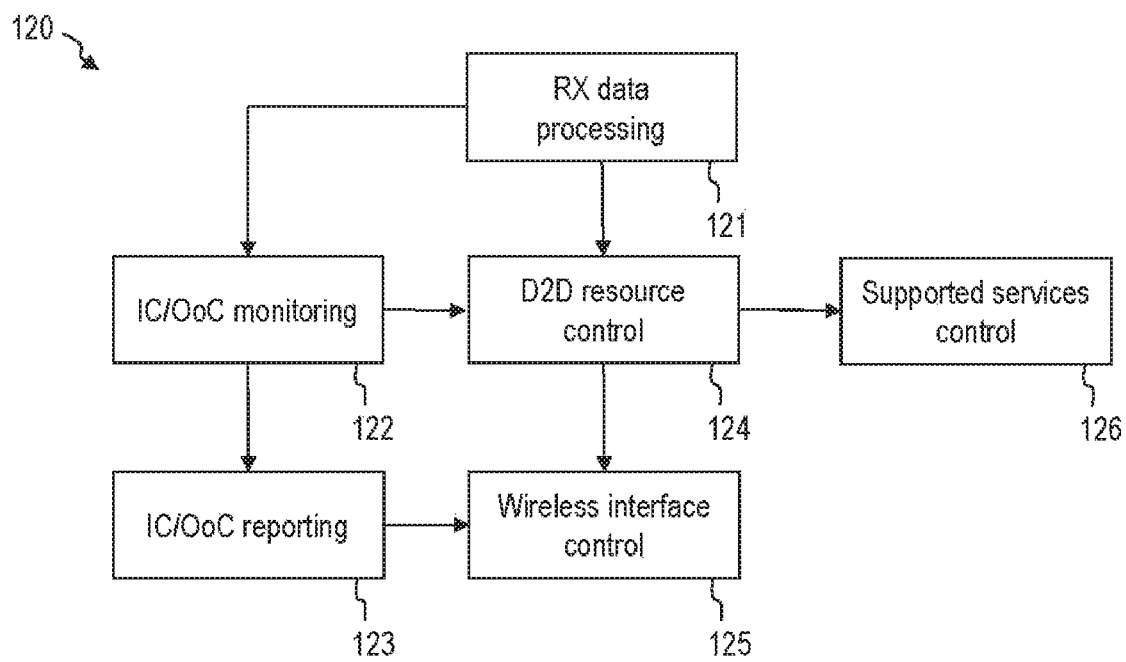
FIG. 13 is a functional block diagram of a user equipment according to an embodiment.

FIG. 13 is a block diagram 120 of a user equipment according to an embodiment. The modules may be implemented in hardware, software, firmware, or a combination thereof.

The user equipment may comprise a processing module 121 for processing received signals. The processing module 121 may be configured to process both signals from a cellular communication network and signals from other user equipments received in D2D discovery and/or D2D communication.

The user equipment may comprise a monitoring module 122 which monitors whether the user equipment is in coverage or out of coverage. The monitoring module may use a SINR or another signal strength indicator for signals received from the RAN to determine whether the user equipment is in coverage or out of coverage.

The monitoring module 122 may optionally also monitor, based on messages received at the wireless interface, whether other user equipments in a device-to-device group are in coverage or out of coverage.

The user equipment may comprise a reporting module 123. The reporting module may be coupled to a wireless interface control 125 to cause transmission of reports at least when the user equipment moves from in coverage to out of coverage and when the user equipment moves from out of coverage into coverage.

The user equipment may comprise a control module 124 for controlling the resources in which D2D discovery and/or D2D communication is performed. The control module 124 may be configured to adapt the resources in which D2D discovery and/or D2D communication is performed, depending on whether the user equipment and optionally other user equipments in the same group are out of coverage. The control module 124 may enable use of an extension resource for D2D discovery and/or D2D communication if all user equipments of the group are out of coverage. The control module 124 may disable use of the extension resource for D2D discovery and/or D2D communication if at least one user equipment of the group is in coverage.

The user equipment may comprise a management module 126 which manages the supported services which make use of D2D communication. The management module 126 may include additional services into a set of supported services which may be executed if an extended D2D resource is available, e.g. because the user equipment and other user equipments in the same group are out of coverage.

In any one the devices, systems and methods disclosed herein, criteria may be employed for triggering the extension of the D2D resource which depend on a signal quality indicator. For illustration, a SINR may be compared to a threshold to determine whether the extension resource may be used for D2D discovery and/or D2D communication.

Different thresholds may be used when determining whether the D2D resource is to be extended and when determining whether the UE finds a suitable cell. For illustration, in order to mitigate interference problems, the extension resource may be selectively enabled for D2D discovery and/or D2D communication only when the network signal strength detected at the user equipment is smaller than a signal strength at which the user equipment would identify a suitable cell.

Figure 14:
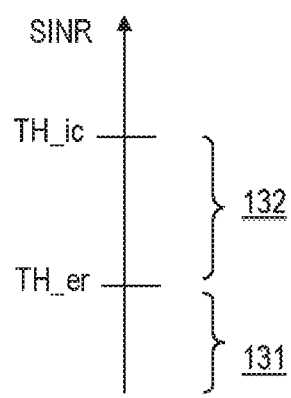
FIG. 14 is a diagram illustrating a quality indicator which may be monitored for selectively enabling the user of the extension resource.

FIG. 14 illustrates the operation of a user equipment according to an embodiment. A signal quality indicator, e.g. a SINR, may be compared to at least one threshold to determine whether the extension resource may be used for D2D discovery and/or D2D communication. The signal quality indicator may be compared to an activation threshold TH_er for the extension resource. Only if the signal quality indicator, for several user equipments in a group, is in a range 131 of values smaller than the activation threshold TH_er, the use of the extension resource may be used for D2D discovery and/or D2D communication is enabled.

The activation threshold TH_er may be smaller than a threshold TH_ic at which the user equipment finds a suitable cell to camp on. In a range of values 132 of the signal quality indicator, the use of the extension resource may be used for D2D discovery and/or D2D communication is disabled and the user equipment has not yet found a suitable cell to camp on.

In any one of the various embodiments, the D2D discovery and/or the D2D communication may include the transmission and/or reception of messages which takes place over the same interface with which the UE communicates with the RAN.

Modifications or alterations may be implemented in other embodiments. For illustration, resources may be pre-configured in UEs not only directly by a base station, but also by another UE which acts as a group head for a D2D communication group, or by a repeater relay.

For further illustration, while some embodiments are described in the context of D2D communication, the techniques are also applicable to D2D discovery.

In exemplary embodiments, the D2D resource may be extended by adding an extension resource to a pre-configured D2D resource if at least two user equipments of a group move out of coverage. The at least two user equipments may form an isolated user group (IUG).

In any one of the embodiments, the information on the in coverage or out of coverage state of a user equipment may be included in SA content or in data content.

Messages transmitted by a group head to enable or disable the use of the extension resource for D2D discovery and/or D2D communication may be included in the SA content of the group head, or in the data content of the group head, or in a D2DSS (D2D synchronization source) or in PD2DSCH content.

Embodiments of the invention allow the resources available for D2D discovery and/or D2D communication to be dynamically adjusted. Interference with RAN communication may be kept moderate or may be prevented.

The invention claimed is:

1. A user equipment that is part of a device-to-device group that includes electronic devices that communicate using device-to-device communication and the user equipment communicates with a cellular communication network in which there are first device-to-device spectrum resources that the electronic devices of the device-to-device group are permitted to use inside a coverage area of the cellular communication network, comprising:
   a wireless interface over which the communication with the cellular communication network is carried out and over which communication with the other electronic devices in the device-to-device group is carried out; and a processing device to control the wireless interface and configured to:
  determine existence of a first condition in which one or more of the electronic devices of the device-to-device group are in the coverage area of the cellular communication network and, during times that the first condition exists, perform device-to-device discovery or device-to-device communication using the first device-to-device spectrum resources; and
  determine existence of a second condition in which at least one of the electronic devices in the device-to-device group is outside the coverage area of the cellular communication network and in which at least one of the electronic devices in the device-to-device group is inside the coverage area and, during times that the second condition exists, perform device-to-device discovery or device-to-device communication using second device-to-device spectrum resources that are non-overlapping with the first device-to-device spectrum resources.

2. The user equipment according to claim 1,
wherein during times that the second condition exists, the user equipment performs device-to-device discovery or device-to-device communication additionally with the first device-to-device spectrum resources.

3. The user equipment according to claim 1,
wherein the user equipment is configured to control the wireless interface to transmit information indicating that the user equipment moved out of the coverage area of the cellular communication network or that the user equipment is out of the coverage area of the cellular communication network.

4. The user equipment according to claim 1,
wherein the user equipment makes the determinations based on messages received at the wireless interface, at least one of the messages enabling the user equipment to use the second device-to-device resources for the device-to-device discovery or the device-to-device communication.

5. The user equipment according to claim 4,
wherein the at least one message comprises a D2D synchronization signal.

6. The user equipment according to claim 1,
wherein the user equipment is configured to not use the second device-to-device resources for the device-to-device discovery or the device-to-device communication if use of the second device-to-device resources will cause interference with a radio access network of the cellular communication network.

7. The user equipment according to claim 1,
wherein the user equipment is configured to use the second device-to-device resources for communication with the cellular communication network if the use of the second device-to-device resources for the device-to-device discovery or the device-to-device communication is not enabled.

8. The user equipment according to claim 2,
wherein the user equipment is configured to use the second device-to-device resources as scheduling assignment resources and as data resources for the device-to-device discovery or the device-to-device communication.

9. The user equipment according to claim 8,
wherein the processing device is operative to determine the scheduling assignment resources in the second device-to-device resources dependent on a mapping between a scheduling assignment resource and a data resource in the first device-to-device spectrum resource.

10. The user equipment according to claim 2,
wherein the user equipment is configured to use the second device-to-device resources as data resources and to use a resource different from the second device-to-device resources as scheduling assignment resources.

11. The user equipment according to claim 1,
wherein the user equipment carries out at least one of an audio call service or a video call service over the device-to-device communication with another of the electronic devices from the device-to-device group.

12. The user equipment according to claim 1, wherein the cellular communication network further has subcarrier frequencies that are reserved for communication between devices supported by the cellular communication network and base stations of the cellular communication network; and
  wherein the second device-to-device spectrum resources comprise one or more of the reserved subcarrier frequencies of the cellular communication network.

13. The user equipment according to claim 1, wherein the second condition exists if every one of the electronic devices in the device-to-device group are outside the coverage area of the cellular communication network.

14. The user equipment according to claim 1,
wherein the processing device is configured to control the wireless interface to receive information from the at least one further user interface which indicates whether the at least one further user equipment is in coverage or out of coverage of the cellular communication network.

15. The user equipment according to claim 1,
wherein the first device-to-device resources are allocated by the base station by a broadcast or multicast message.

* * * * *